US012310909B2

(12) United States Patent
Mouragues et al.

(10) Patent No.: US 12,310,909 B2
(45) Date of Patent: May 27, 2025

(54) MASSAGE DEVICE WITH TWO MODULES

(71) Applicant: DECATHLON, Villeneuve d'Ascq (FR)

(72) Inventors: Stéphanie Mouragues, Villeneuve d'Ascq (FR); Pascal Rumigny, Villeneuve d'Ascq (FR); Johann Guerizec, Villeneuve d'Ascq (FR)

(73) Assignee: DECATHLON, Villeneuve d'Ascq (FR)

( * ) Notice: Subject to any disclaimer, the term of this patent is extended or adjusted under 35 U.S.C. 154(b) by 749 days.

(21) Appl. No.: 17/552,772

(22) Filed: Dec. 16, 2021

(65) Prior Publication Data

US 2022/0192915 A1 Jun. 23, 2022

(30) Foreign Application Priority Data

Dec. 21, 2020 (FR) ...................................... 2013786

(51) Int. Cl.
*A61H 15/00* (2006.01)

(52) U.S. Cl.
CPC ....... *A61H 15/00* (2013.01); *A61H 2015/005* (2013.01); *A61H 2201/1654* (2013.01); *A61H 2201/1692* (2013.01); *A61H 2201/1695* (2013.01)

(58) Field of Classification Search
CPC ...... A61H 15/00–02; A61H 2201/1654; A61H 2201/1692; A61H 2201/1695; A61H 2201/0107; A61H 2201/0157; A61H 2201/0161; A61H 2201/0192; A61H 2201/1253; A61H 2201/1284; A61H 2201/169
See application file for complete search history.

(56) References Cited

U.S. PATENT DOCUMENTS

| | | | | |
|---|---|---|---|---|
| 5,413,551 | A * | 5/1995 | Wu | A61H 15/00 601/131 |
| 10,561,923 | B1 * | 2/2020 | Harvey | A63B 71/0036 |

(Continued)

FOREIGN PATENT DOCUMENTS

| | | | | |
|---|---|---|---|---|
| AU | 652115 B * | 8/1994 | | A63B 21/00043 |
| CN | 1448200 A | 10/2003 | | |
| EP | 0688584 A1 * | 12/1995 | | A63B 23/14 |

*Primary Examiner* — Rachel T Sippel
*Assistant Examiner* — Jacqueline M Pinderski
(74) *Attorney, Agent, or Firm* — Harris Beach Murtha Cullina PLLC

(57) ABSTRACT

The invention relates to a massage device having two modules mounted in relative translation to one another by a mechanism allowing their reversible arrangement in at least one first massage configuration and a second message configuration when the modules are brought together or moved apart from one another. Each of the modules has a rear cap with outer geometry arranged to, in the first massage configuration, form a first massage surface with the cap of the other module. Each of the modules has a front extension with outer geometry arranged to, in the second massage configuration, form a second massage surface with the extension of the other module. The extensions are arranged to be able to interlock with one another when the modules are brought together towards the first massage configuration.

14 Claims, 2 Drawing Sheets

(56) References Cited

U.S. PATENT DOCUMENTS

| | | | | |
|---|---|---|---|---|
| 2013/0096472 | A1* | 4/2013 | Bertram | A61H 15/0092 601/120 |
| 2015/0265457 | A1* | 9/2015 | Connors | A61H 15/02 601/15 |

* cited by examiner

MASSAGE DEVICE WITH TWO MODULES

CROSS-REFERENCE TO RELATED APPLICATION

This application claims the priority of French patent application number 2013786, filed on Dec. 21, 2020, the entire contents of which are incorporated herein by reference.

TECHNICAL FIELD

The invention relates to a massage device for the body, in particular of the type comprising at least one module whose outer surface can be applied onto the area of the body to be massaged, for example by manual rolling.

BACKGROUND

It applies more particularly to massage devices having at least two possible configurations of use with different massage properties, so as to allow the user to apply different types of treatment with the same device, in particular on different areas of the body.

A massage device is known from document CN-1 448 200 which comprises two modules mounted in translation relative to one another by means of a mechanism that allows their reversible arrangement between a spaced apart position and a close position, each of the modules having cap whose outer surface is arranged to form a massage surface.

This massage device makes it possible to move the two massage surfaces apart or towards one another, but does not provide two massage configurations by means of a specific respective massage surface.

SUMMARY

The invention aims to improve the prior art by proposing in particular a massage device which is designed to be selectively arranged in two massage configurations, each forming a specific massage surface, without requiring additional modules.

For this purpose, the invention proposes a massage device comprising two modules which are mounted in relative translation to one another by means of a mechanism that allows them to be arranged reversibly in at least one first—and respectively one second—massage configuration, in which the modules are brought together—or moved apart from one another—, each of said modules having a rear cap whose outer geometry is arranged so as to, in the first massage configuration, form a first massage surface with the cap of the other module, each of the modules having a front extension whose outer geometry is arranged so as to, in the second massage configuration, form a second massage surface with the extension of the other module, said extensions being designed to interlock with one another when the modules are brought together into the first massage configuration.

BRIEF DESCRIPTION OF THE DRAWINGS

Additional features and advantages of the invention are given in the following description, which is made with reference to the accompanying figures in which.

DETAILED DESCRIPTION

A massage device for the body is described below in connection with these figures.

This device can be used in particular to help a sportsperson benefit from muscular recovery after exercise, so as to limit the risk of injury, microtraumas and/or muscle soreness, and thus to be able to resume training and/or the activities of daily life quickly.

Thus, the massage device is particularly suitable for use after a sporting activity which requires intensive muscular effort, such as for example triathlon, running, particularly in a natural environment (trail running, cross-country), cycling, cross-training or weight training exercise.

The massage device has at least two possible configurations of use with different massage properties, so as to enable the user to apply different types of treatment with the same massage device, in particular on different areas of the body.

Figure 1A:
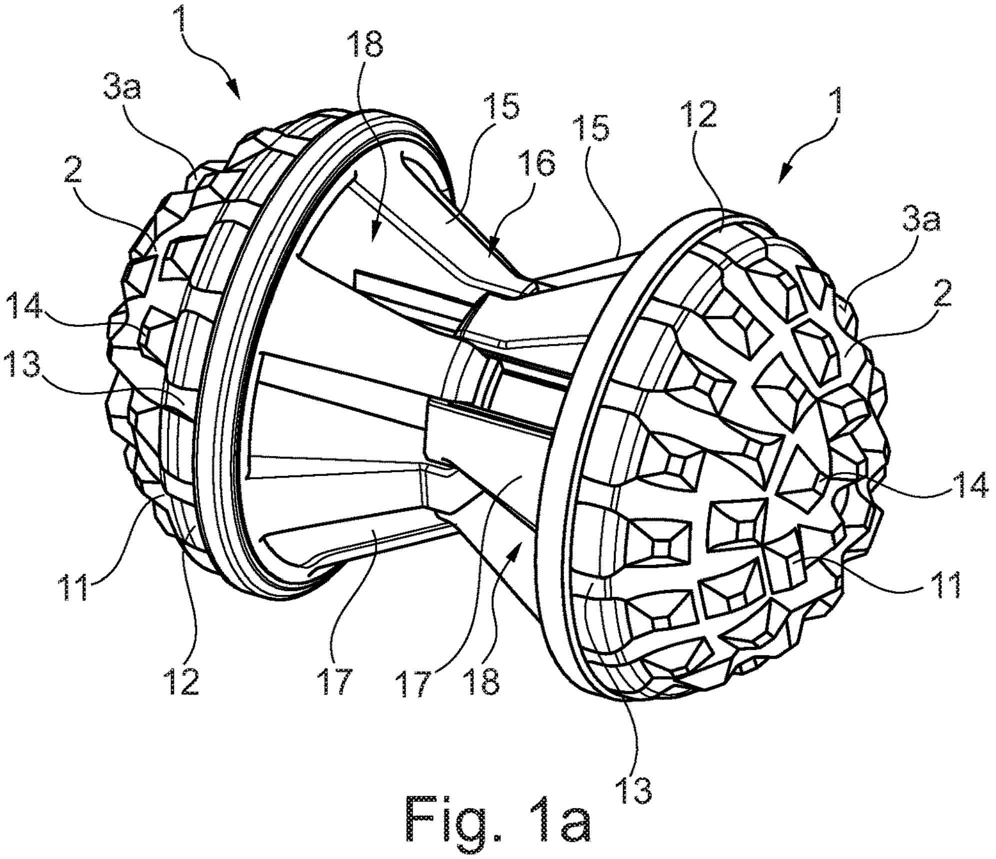
FIG. 1*a* and FIG. 1*b* represent in perspective a massage device according to an embodiment of the invention, respectively in the second (FIG. 1*a*) and in the first (FIG. 1*b*) massage configurations.
Figure 1B:
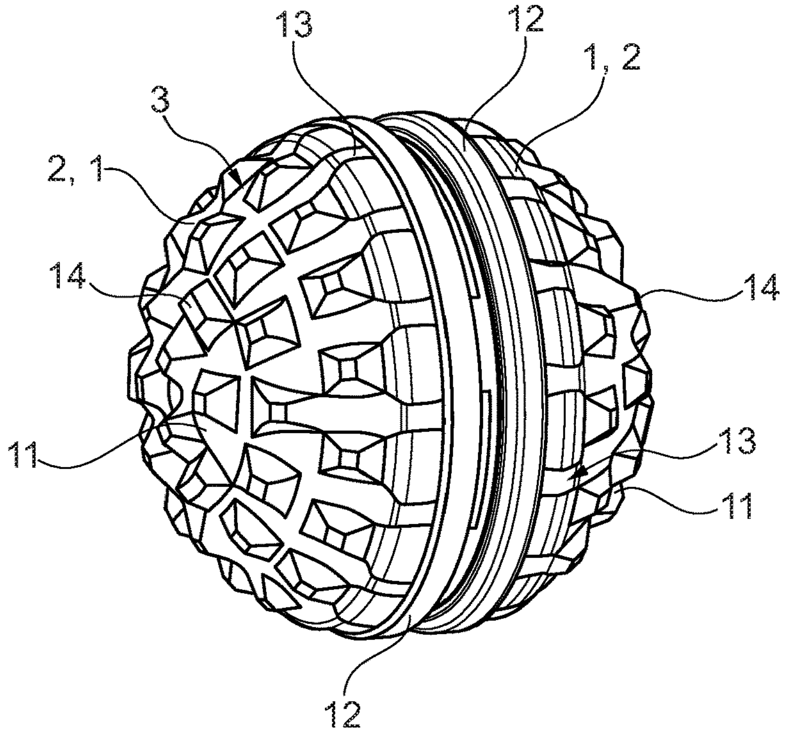

To this end, the massage device comprises two modules 1 mounted in relative translation to one another by means of a mechanism which allows their reversible arrangement in at least:

- a first massage configuration, in which the modules 1 are brought together (FIG. 1*b*); and
- a second massage configuration, in which said modules are moved apart from one another (FIG. 1*a*).

Each of the modules 1 has a rear cap 2 whose outer geometry is arranged to form, in the first massage configuration, a first massage surface 3 with the cap 2 of the other module 1, in particular by manually rolling said surface over the area of the body to be massaged.

Figure 2:
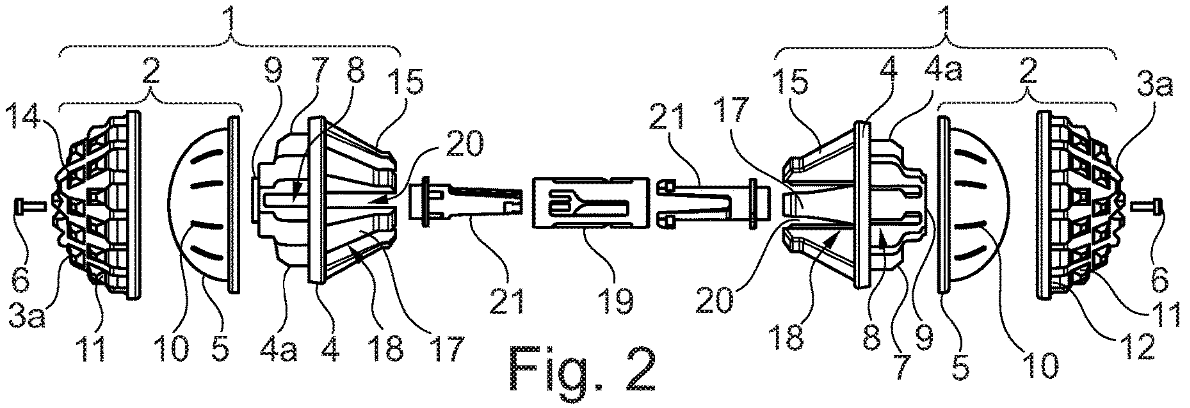
FIG. 2 represents in an exploded view the massage device of FIGS. 1*a* and 1*b*.

To achieve this, as shown in FIG. 2, each of the modules 1 has a body 4 to the rear of which a shell 5 is attached to form a cap 2.

In the embodiment shown, the body 4 has a rear part 4*a* to which the shell 5 is fixed by means of a screw 6. In particular, the rear part comprises an angular succession of radial blades 7 separated two-by-two by a gap 8, and connected at their rear ends by a platform 9 in which a threaded hole is formed for screwing the shell 5.

The shell 5 has an angular succession of ribs 10 which extend on the inner wall of the shell 5, said ribs cooperating with the blades 7 to prevent any relative rotation of said shell with respect to the body 4, particularly during a massage.

In the embodiment shown, the caps 2 have an hemispherical outer geometry so as to form a first massage surface 3 of a spherical casing.

This first configuration makes it possible to perform a massage which is localized on several areas of the user's body, in particular the back, hips, gluteal muscles, shoulders, feet and hamstring muscles. Furthermore, in this first configuration, the massage device has a reduced size, in particular with a diameter of about 80 mm, which means it can be stored and transported easily, particularly in a sports or travel bag.

With regard to the figures, each shell 5 has a hemispherical geometry, with an outer surface which is covered by a skin 11 of complementary hemispherical geometry, the first massage surface 3 being formed on the outer surface 3*a* of said skin.

In particular, the skin 11 is fixed onto the shell by overmoulding or by adhesion. In particular, the skin 11 has an annular base 12 provided with ribs 13 that are spaced apart at an angle, so as to form a gripping area to enable the user to easily manipulate the modules 1, in particular to move them between the two massage configurations.

The outer surface of each skin 11 has a structure suitable for massage, in particular with projections 14 having a substantially pyramidal shape distributed evenly over said outer surface. The shape and/or the distribution of the projections 14 can be adjusted according to the type of massage desired.

Thus, the first massage surface 3 is suitable for deep massage, in particular for the prevention and/or relief of pain and/or muscle soreness following a sporting activity.

Each of the modules 1 also has a front extension 15, formed at the front of the body 4 whose outer geometry is arranged to, in the second massage configuration, form a second massage surface 16 with the extension 15 of the other module 1.

Such an arrangement makes it possible to obtain a more complete massage in the second configuration, which is particularly suitable for other parts of the body, such as for example the cervical and spinal muscles.

In particular, the first 3 and second 16 massage surfaces have a different geometry, and the second massage surface 16 is formed between the caps 2 in a spaced apart position, so that said second massage surface is surrounded by two massage surfaces 3*a* formed by the outer geometry of respectively one of said caps.

Thus, in the second massage configuration, it is possible to simultaneously massage adjacent body parts with massage surfaces 3*a*, 16 each having a geometry adapted to the shape of respectively the part to be massaged.

In the embodiment shown, the extensions 15 have a truncated conical outer geometry, forming a second massage surface 16 with a rotary conical casing. This geometry is particularly suitable for massaging an area of part of the body with a protruding bone, in particular a clavicle or the vertebral column.

The second surface 16 can have a smoother texture than the first surface 3, which makes it suitable for a more superficial and more comfortable massage, in particular for the purpose of muscle relaxation.

In an advantageous manner, the first 3 and second 16 surfaces can also be made on layers of material, for example foam materials, with different densities and/or hardnesses.

Thus, the first massage surface 3 can have greater rigidity so as to apply deeper pressure on the muscles, and therefore more effectively alleviate the pain and/or muscle soreness caused by a sporting activity.

Conversely, the second massage surface 16 can have greater flexibility, so as to apply a more superficial and comfortable massage to the area concerned, particularly for muscle relaxation purposes.

The extensions 15 are furthermore arranged to be able to interlock with each other when the modules 1 are moved towards the first massage configuration, so as to allow the device to be compact in said first configuration.

For this purpose, the extensions 15 each comprise an angular succession of fingers 17 spaced apart by slots 18 with a complementary form, the fingers 17—respectively the slots 18—of a module 1 being angularly disposed facing the slots 18—respectively the fingers 17—of the other module 1 to allow them to interlock when bringing together the modules 1.

The second massage surface 16 extends over the outer walls of the fingers 17, making it possible to axially superimpose the massage function and the interlocking function of the extensions 15, and thus reduce the bulkiness of the device in the first configuration.

Furthermore, in a first massage configuration, the front ends of the fingers 17 of one extension 15 are arranged to each be disposed in a gap 8 formed between two adjacent radial blades 7 of the body 4 of the other module 1, i.e. the slots 18 are extended backwards by respectively a gap 8.

To enable its displacement between the two massage configurations, the device comprises a shaft 19, on either side of which the modules 1 are mounted in translation.

Furthermore, the extension 15 of each module 1 has a bore 20 opening into the cap 2, each side of the shaft 19 being mounted in translation in a respective bore 20.

In the embodiment shown, each of the bores 20 is provided with a rod 21 which is mounted in translation in the shaft 19, said rods being fixable to the corresponding module 1 by means of the screw 6. In particular, each rod 21 has two diametrically opposed legs 22 which extend axially, said legs each being mounted in a respective translational guide rail 23 formed on the shaft 19.

Advantageously, the legs 22 of a rod 21 are arranged at 90° to the legs 22 of the other rod 21 so as to optimize the amplitude of the relative translation of the modules 1, and thus maximize the area of the massage surfaces.

Each of the modules 1 is provided with at least one means which cooperates geometrically with a complementary means of the shaft 19 to define the relative position of the modules 1 in at least one of the massage configurations.

To this end, each of the rods 21 and the shaft 19 have at least one lug 24—front stop 25 assembly and/or at least one lug 26—rear stop 27 assembly respectively defining a massage configuration.

Figure 2A:
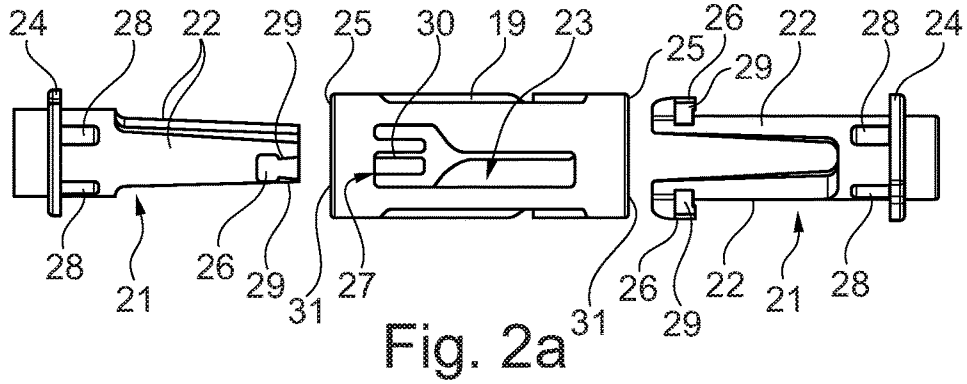
FIG. 2*a* represents more particularly the rods and the shaft which enable the displacement of the modules between the two massage configurations.
Figure 3:
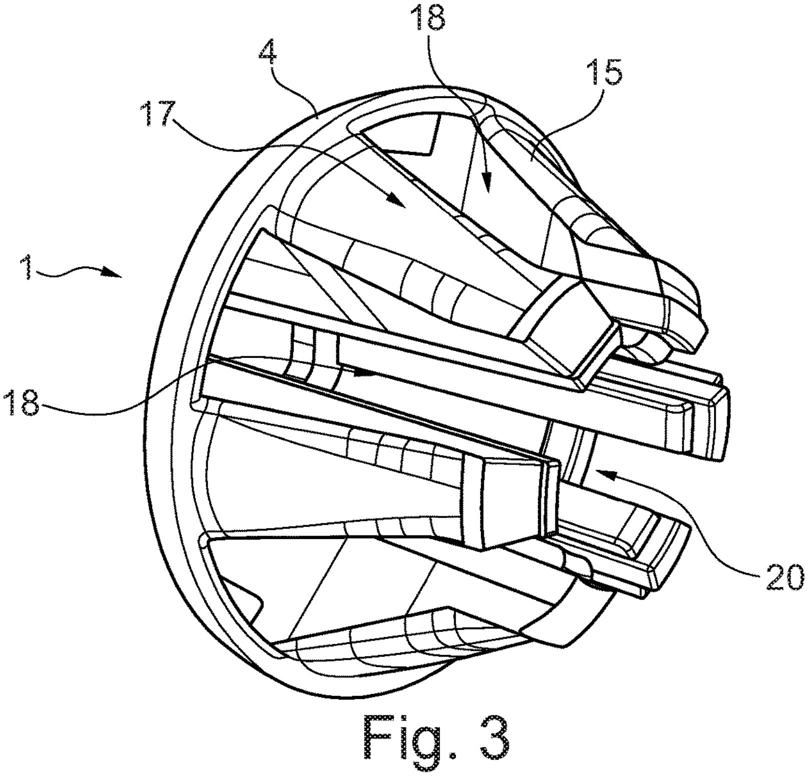
FIG. 3 represents in a perspective view the front of an extension of a module of the preceding figures.

In particular, as shown in FIG. 2*a*, each rod 21 has an annular flange 24 formed close to its rear end, said flange being arranged to come into forward abutment against the corresponding end 25 of the shaft 19 when the modules 1 are arranged in the first massage configuration.

Furthermore, each leg 22 has a lug 26 formed on the outside of its front end, said lug being intended to abut against a rear edge 27 of the corresponding guide rail 23 during the arrangement of the modules 1 in the second massage configuration.

To avoid any relative displacement of the modules 1 relative to the shaft 19 during the use of the massage device, each of the modules 1 is also provided with at least one means cooperating geometrically with a complementary means of the axis 19 so as to lock the relative position of the modules 1 in at least one of the massage configurations.

To this end, each of the rods 21 and the shaft 19 have at least one projection 28—front housing 31 assembly and/or at least one projection 29—rear housing 30 assembly defining a massage configuration respectively.

In particular, each rod 21 has at least two longitudinal projections 28 angularly spaced apart at an angle in the vicinity of the flange 24, and designed to engage respectively in a front housing 31 formed in the shaft 19 in the vicinity of its corresponding end 25, when said flange comes into frontal abutment against said end so as to lock the modules 1 in the first massage configuration.

Likewise, each lug 26 has at least one lateral projection 29 intended to snap into a housing 30 formed in the rear part of the corresponding guide rail 23, in particular when said lug abuts at the rear against the edge 27 of said rail so as to lock the modules 1 in the second massage configuration.

What is claimed is:

1. A massage device comprising two modules, the two modules comprising a first module and a second module, mounted in relative translation to one another by a mechanism configured to allow the modules reversible arrangement in at least a first massage configuration and a second massage configuration, in which the modules are brought together in the first massage configuration and moved apart from one another in the second massage configuration, each of the modules having a rear cap with an outer geometry arranged to form a first massage surface with the rear cap of the other module when in the first massage configuration, wherein each of the modules has a front extension having an outer geometry such that when the modules are arranged in the second massage configuration, the front extensions form a second massage surface, the front extensions being configured to interlock with each other when the modules are brought together towards the first massage configuration, and wherein the front extensions of the first module and second module comprise an angular succession of fingers which are spaced apart by slots of complementary form, the fingers and slots of the first module being arranged at angles relative to the fingers and slots of the second module, to enable an imbrication of the fingers and slots of the first module with the fingers and slots of the second module when the two modules are brought together.

2. The massage device according to claim 1, wherein the first massage surface and the second massage surface have a different geometries.

3. The massage device according to claim 1, wherein the second massage surface is formed between the rear caps in a spaced apart position, said second massage surface is surrounded by two massage surfaces formed by the outer geometries of the spaced apart rear caps.

4. The massage device according to claim 1, wherein the outer geometries of the rear caps are hemispherical forming a spherical casing.

5. The massage device according to claim 1, wherein the outer geometries of the front extensions are truncated cones forming a rotary conical casing.

6. The massage device according to claim 1, wherein the fingers have outer walls and the second massage surface extends over the outer walls of the fingers.

7. The massage device according to claim 1, comprising a shaft on either side of which the modules are mounted in translation.

8. The massage device according to claim 7, wherein the front extension of each module has a bore opening into the respective rear cap, each side of the shaft being mounted in translation in a respective bore.

9. The massage device according to claim 8, wherein each of the bores is provided with a rod, which is mounted in translation in the shaft.

10. The massage device according to claim 7, wherein each of the modules is provided with at least one lug which is configured to engage at least one stop of the shaft to define a relative position of the modules in at least one of the massage configurations.

11. The massage device according to claim 7, wherein each of the modules is provided with at least one projection which is configured to engage with a complementary housing of the shaft to lock a relative position of the modules in at least one of the massage configurations.

12. The massage device according to claim 1, wherein each of the modules has a body, the body having a front on which the front extension is formed, and a shell attached to a rear of said body to form the rear cap.

13. The massage device according to claim 1, wherein an outer surface of each of the rear caps is covered by a respective skin which has a complementary inner geometry, the first massage surface being formed on outer surfaces of said skins.

14. The massage device according to claim 13, wherein the outer surfaces of the skins have structures which are suitable for massage.

* * * * *